Nov. 24, 1964  J D. HUGHSON ETAL  3,158,409
BRAKE CONTROL SYSTEM FOR RAILWAY TRAINS
Filed Sept. 18, 1961  3 Sheets-Sheet 1
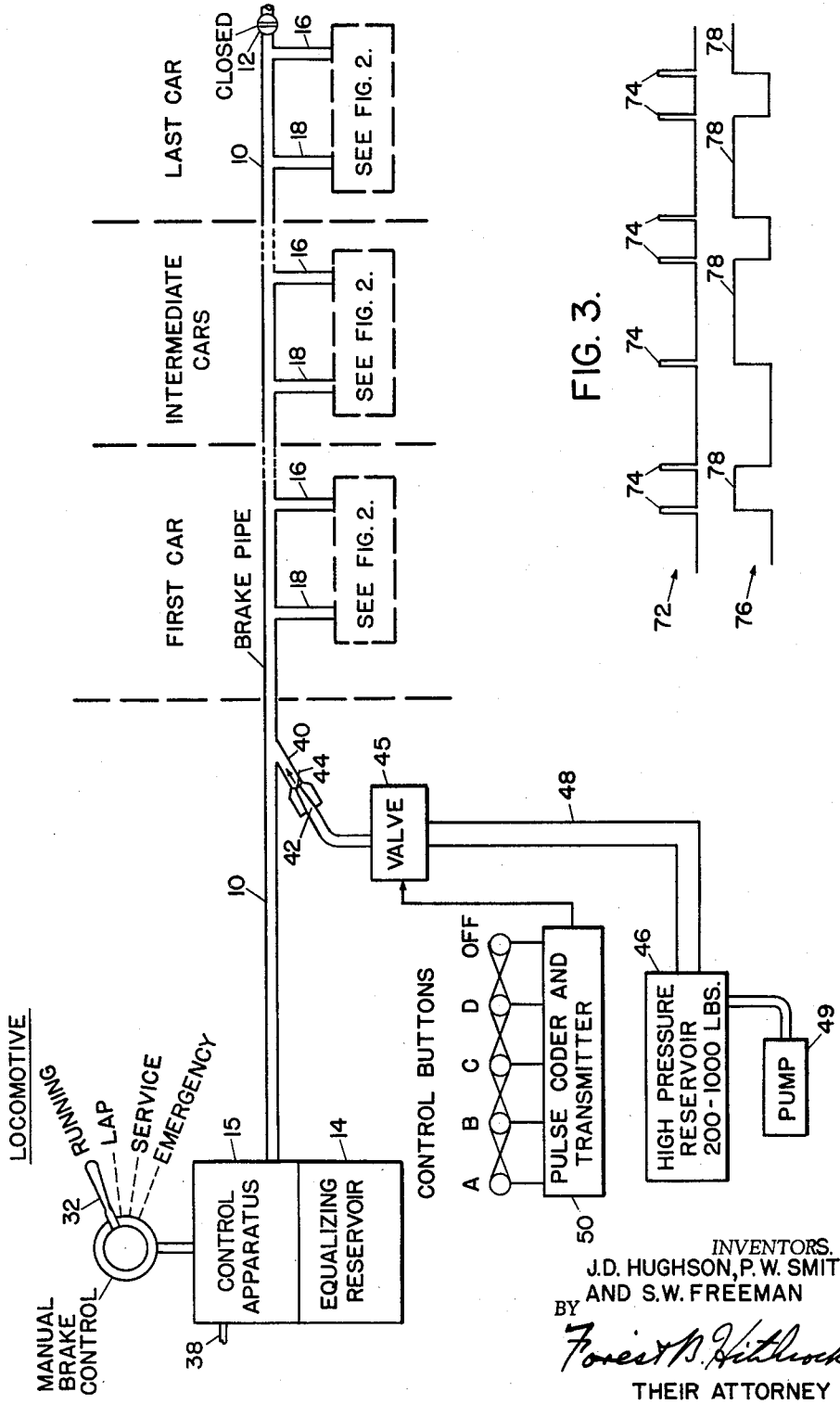
INVENTORS.
J.D. HUGHSON, P. W. SMITH,
AND S.W. FREEMAN
BY
THEIR ATTORNEY

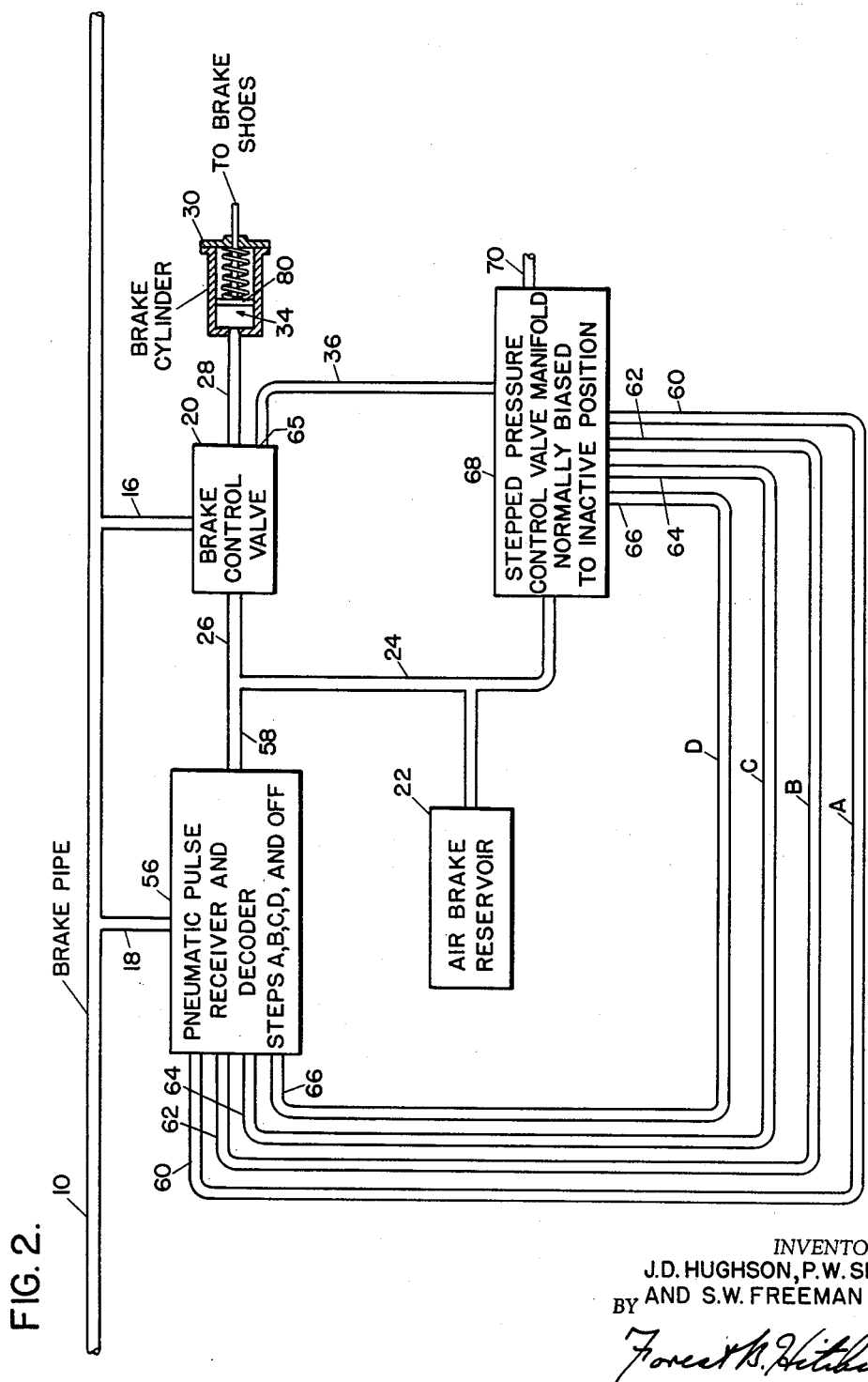

Nov. 24, 1964  J D. HUGHSON ETAL  3,158,409
BRAKE CONTROL SYSTEM FOR RAILWAY TRAINS
Filed Sept. 18, 1961  3 Sheets-Sheet 3

INVENTORS
J.D.HUGHSON, S.W.FREEMAN
BY  AND P.W.SMITH

THEIR ATTORNEY nited States Patent Office 3,158,409
Patented Nov. 24, 1964

3,158,409
BRAKE CONTROL SYSTEM FOR RAILWAY
TRAINS
J Donald Hughson, Sydney W. Freeman, and Percy W. Smith, Rochester, N.Y., assignors to General Signal Corporation
Filed Sept. 18, 1961, Ser. No. 138,761
17 Claims. (Cl. 303—15)

The present invention relates to a pneumatically operated braking system, and more particularly to an improved pneumatic operating system for applying the brakes of railway trains.

At the present time, the conventional railway train is equipped with air brake apparatus which includes an equalizing reservoir and equalizing piston on the locomotive connected to a brake air line, commonly known as a brake pipe, extending from such equalizing piston through all the cars of the train, with such brake pipe having a closed valve at the end of the last car of the train. When the equalizing reservoir pressure is lower than the brake pipe pressure the equalizing piston opens an exhaust valve and allows the brake pipe pressure to become equal to the equalizing reservoir pressure. Such a brake pipe of course includes all the coupling hose connections between the cars. An air reservoir on each car is connected to the brake pipe portion or section for that car.

Such connection of the brake pipe section of each car to the reservoir on that car is made through a controlling valve which, with the normal air pressure in the brake pipe, connects such brake pipe to that reservoir so that the air pressure throughout the entire train system is substantially the same as that in the equalizing reservoir on the locomotive.

On the locomotive there is a manual brake control lever which has several positions such as "running" position, "lap" position, "service" position, and "emergency" position. When the brake control lever is in its "running" position, then the equalizing reservoir is directly connected to the same pressure source as the brake pipe. When the manual control lever is in its "lap" position, the equalizing reservoir is disconnected from the brake pipe but no air is exhausted either from the brake pipe or from the equalizing reservoir nor are either being changed. On the other hand, when the brake control lever is moved to its service position, the equalizing reservoir is vented so that its pressure can be reduced to some selected value which the engineer may determine by watching the pressure indicator. When the air pressure in the equalizing reservoir is reduced to the value he desires, the engineer then moves the brake control lever to the "lap" position to hold that degree of control.

In due course, the brake pipe has its pressure reduced to that in the equalizing reservoir by the action of the usual equalizing piston of the locomotive control apparatus.

In the event that some emergency arises he can operate his brake control lever to the emergency position which prevents reduction of the pressure in the equalizing reservoir but directly vents the brake pipe to atmosphere.

In brief, the engineman may preselect the degree of brake application by venting the equalizing reservoir until the drop in pressure from its normal value is the drop which the engineman desires.

The reduction of the pressure in the equalizing reservoir of course causes a reduction in the pressure of the brake pipe on the car adjacent the locomotive and this initial reduction causes a limited venting to atmosphere of the brake pipe on that car and the application of air from the reservoir on that car to the associated brake cylinder to apply the brakes. This limited venting of air on a car is accomplished by a so-called brake control valve. Although this venting of the brake pipe by such valve on the car is of a limited amount, it assists in the arrival of an initial reduction in the brake pipe pressure on the next car where its brake control valve performs the same functions. Thus, a brake applying condition is established on each car in succession at a more rapid rate than would be accomplished if the entire brake line were to have its pressure reduced through the equalizing piston exhaust on the locomotive in accordance with the reduction in pressure of the equalizing tank on the locomotive.

When the reservoir on each car has its air pressure applied to the brake cylinders for that car by the brake control valve and is thus reduced in pressure to correspond to the then reduced pressure in the brake pipe, such condition is maintained with the brake control lever in the "lap" position. Should the engineman desire to more severely apply the brakes, he again moves his manual control lever to the service position to further reduce the pressure in the equalizing reservoir, but in this instance the time to reduce the brake pipe pressure must be wholly dependent upon the exhausting of air through the equalizing piston exhaust on the locomotive since under these circumstances the brake control valves for each car are ineffective to cause further venting of the brake pipe. Thus, it can be seen that the increased braking effect does not quickly reach the rear cars of a long train.

When the engineman desires to remove the brakes or reduce the braking effect he moves his brake control lever to its "running" position. This causes the pressure in the equalizing reservoir to build up to its normal value and to build up the pressure in the brake pipe to a corresponding value. When a brake release is initiated it is desirable that the brakes release as soon as possible. The conventional system is designed so that the car brakes release completely at a slight increase in brake pipe pressure rather than having them release slowly in response to the increasing brake pipe pressure. This conventional system would, however, still require considerable time to build up the pressure in the brake pipe since the brake pipe under these conditions must also supply recharging air to the reservoirs on all of the cars. Also, under these circumstances the engineman must leave his control valve in a "running" position until all of the brakes have been removed and their associated reservoirs recharged at least to some extent. Thus, the braking pressure cannot be changed to some intermediate value until the brakes have been entirely restored to non-braking conditions after which the engineman can again reduce the equalizing reservoir air pressure and brake pipe air pressure to some other desired value. Such delay in control is undesirable, and although various arrangements have been proposed for eliminating such delay, they all have their drawbacks.

In an attempt to overcome these limitations and disadvantages in conventional braking systems, an auxiliary brake control system has heretofore been provided which is used in conjunction with this regular braking system wherein the brake control valves of each car are controlled simultaneously by electromagnetic means. However, except in fast passenger trains, it has been found that the increased expense together with the unreliability in the many electrical connections necessary between the cars renders this type of system impractical for freight trains.

The purpose of the present invention is to provide an auxiliary brake control system, which may be used on freight trains so that a quick and uniform stopping action can be effected regardless of the length of the train, to overcome the inherent disadvantages in the conventional brake control system without affecting any of its obvious advantages.

In furtherance thereof, one of the objects of the present invention is to provide an improved braking system which provides uniform and quick action in applying the brakes of a railway train.

Another object of this invention is to provide an improved braking system which permits the brakes to be fully applied and partially released and again fully applied as desired to effect varying degrees of braking.

Another object of this invention is to provide an improved auxiliary braking system which effectively operates the brakes without the necessity of reducing the air pressure in the brake pipe to obtain a positive control.

Another object of this invention is to provide an improved braking system wherein the brake pipe and the individual pressure tanks or reservoirs on the cars may be recharged and maintained at their normal pressures even during the application of the brakes.

A further object of this invention is to provide an improved auxiliary braking system which may be easily installed and connected to the braking systems of freight cars now in use, as well as incorporated in the braking systems of freight cars under construction.

A still further object of this invention is to provide an improved braking system of the character described which permits such a fine degree of control over the brakes of the train that the system may be operated effectively by remote control.

A still further object of this invention is to provide an improved auxiliary braking system which does not use electrical apparatus on the individual cars or require any electrical connections between the individual cars and the locomotive.

Other objects of this invention will become apparent from the specification, the drawings, and the appended claims.

In the drawings:

FIG. 1 shows fragmentarily a braking system for a train illustrating diagrammatically and in block form the control apparatus on the locomotive in accordance with one embodiment of this invention;

FIG. 2 illustrates in block form that portion of the braking system according to this embodiment of the invention that is installed on each car of a train;

FIG. 3 illustrates graphically a series of sharp pulses transmitted by way of the brake pipe arranged according to a typical code, and the corresponding decoded pulses for influencing the apparatus on each of the cars;

Figure 5:
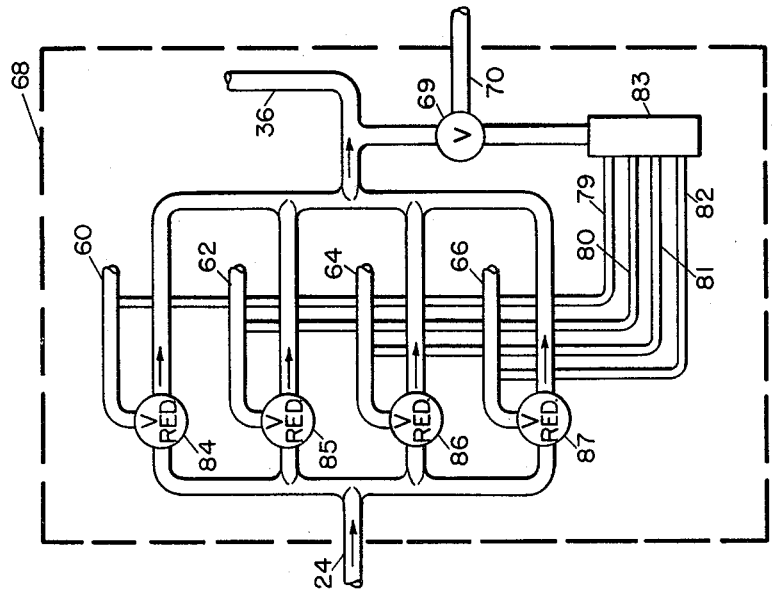
FIG. 5 illustrates the details of the pressure valve manifold which may be used with the present invention.

In carrying out the present invention, a nozzle is connected to and in communication with the interior of the brake pipe at the forward or locomotive end thereof, a quick acting pulsing device, which is controlled by a coding apparatus and transmitter, serves to introduce into the brake pipe by way of the nozzle sharp pulses of high pressure air or gas supplied from a high pressure tank that contains this air or gas under a pressure considerably greater than the maximum pressure in the brake pipe.

These short sharp pulses are sensed by a receiver on each of the cars that is connected to the brake pipe and are decoded to selectively render active a pressure selecting reducing valve apparatus which controls the amount of pressure that is admitted into the brake cylinder from the reservoir or tank of its respective car. The air brake reservoir on each car, according to the present embodiment of the invention, provides the air pressure necessary not only to operate the brake in accordance with the degree of control desired, but also provides the air pressure necessary for operating the receiving and decoding apparatus employed in the present invention.

In the illustrated embodiment of the present invention, and referring to the drawings by numerals of reference, a conventional brake pipe, referred to at 10 (FIG. 1) extends from the locomotive throughout the length of the train. The rear end of this brake pipe 10 is closed off by a valve 12 after the train is made up, and the front end of the brake pipe 10 is connected to the usual equalizing reservoir 14 or Control Apparatus 15 on the locomotive. Branch pipes 16 and 18 extend from the main brake pipe at each individual car.

Each branch line 16 of the brake pipe 10 is connected to a brake control valve 20 (FIG. 2). This brake control valve is conventional and may be of the type well known in the art as a triple valve of the type described in instruction pamphlet No. 5062, entitled "AB Freight Brake Equipment," published by the Westinghouse Air Brake Co., copyrighted 1945, and as revised to June, 1958. The brake control valve 20 is operative to permit air under pressure from the brake pipe 10 to recharge an air brake reservoir or tank 22 upon the conventional release of the brakes.

When the pressure in the brake pipe 10 is reduced below the pressure of the air in the tank or reservoir 22, the control valve 20 opens to admit air under pressure from the reservoir 22 through pipes 24, 26 and 28 into the brake cylinder 30.

A conventional lever 32 of a manual brake valve is adapted to be selectively operated to either a "running" position, a "lap" position, a "service" position, or an "emergency" position. When the lever 32 is in its running position the brakes of the train are released and chamber 34 of the brake cylinder 30 is in communication with a pipe 36 through pipe 28 and the brake control valve 20. When the lever 32 is moved to its "service" position, the air in the brake pipe 10 is reduced after the initial reduction by releasing the air through an exhaust port 38 on the locomotive. The amount of reduction of air pressure in the brake pipe 10 controls the amount of air pressure admitted into the chamber 34. When the pressure has been reduced to a predetermined amount, the brake lever 32 is moved to its lap position to maintain the desired pressure in the brake pipe 10 and thus the desired degree of braking.

A branch line 40 is connected to the brake pipe 10 and has sealingly positioned therein a nozzle 42 having an opening 44. The nozzle 42 may be of various sizes in accordance with the individual requirements of practice. For example, in some installations, where the train is relatively short it may be desirable to have a longer opening 44 using certain pressures. In other installations, it may be advantageous to have the nozzle opening 44 of small diameter and use higher pressures for increasing the velocity of the air mass traveling out of the nozzle, and thus raise the efficiency of transmission for relatively long trains. In the illustrated embodiment, the nozzle opening 44 is shown as being approximately one-half the size of the brake pipe 10. The nozzle 42 is connected to a standard electromagnetic valve 45 that has an input connected to a high pressure reservoir 46 through a pipe 48. The valve 45 may be of any type which will cause air to flow through the opening 44 from the pipe 48 as long as energy is applied thereto. Thus, a short pulse of energy to the electromagnetic portion of the valve 45 permits a correspondingly short pulse of high pressure air from the reservoir 46 to be introduced into the brake pipe 10. A pump 49 is used to maintain the reservoir 46 at its desired pressure.

A pulse coding and transmitting apparatus 50 is provided to control the energizing and deenergizing of the valve 45. This pulse coding and transmitting apparatus 50 may be of any standard type that includes, for example, shift registers, which permit the energy to be read out and applied to the valve 45 in serial form according to a predetermined code or, for example, the central office portion of a time code system shown and described in U.S. Patent No. 2,399,734 issued May 7, 1946, to which reference is made for a detailed description thereof. Push buttons A, B, C, D and "off" are used to select the particular code which is to be produced by the coding apparatus 50.

These high pressure bursts or pulses of air (or other gas) introduced into the brake pipe 10 from the nozzle opening 44, travel slightly in excess of 1000 feet per second. It has been found that because of substantial attenuation the pulses should have a pressure of at least 100 pounds in excess of the normal brake pipe pressure in order to control the brakes of a train having 100 cars. However, a higher pressure or lower pressure differential may be used depending on the length of the train.

Figure 4:
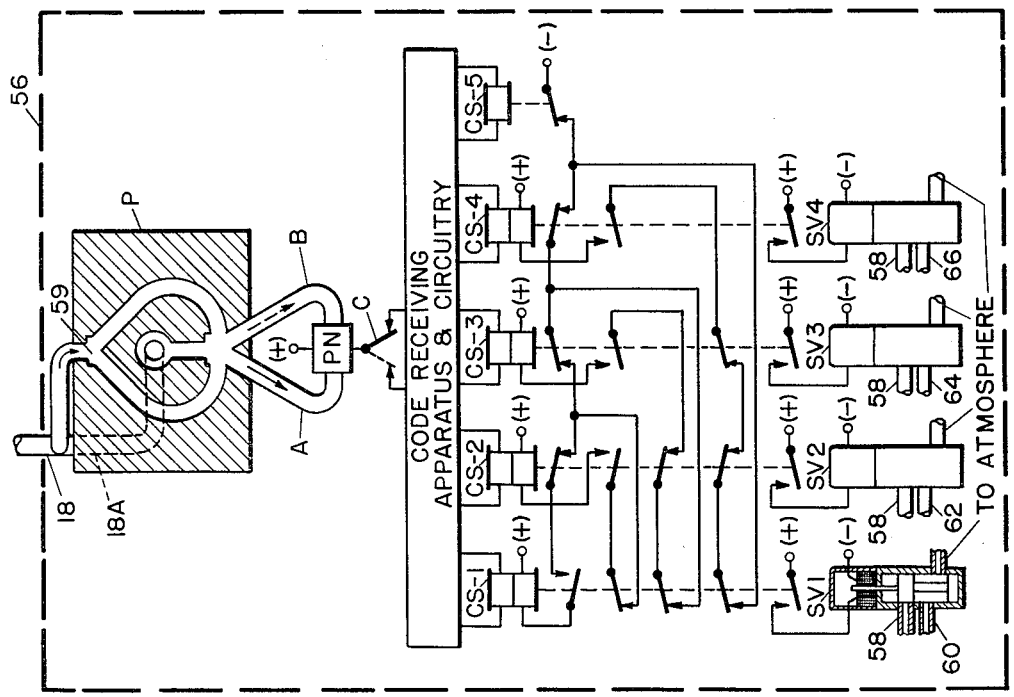
FIG. 4 illustrates a typical pneumatic pulse receiver and decoder which may be used with the present invention.

These sharp short bursts of high pressure introduced into the brake pipe 10 are sensed by a pneumatic pulse receiver and decoding apparatus 56 connected to the brake pipe through the branch line 18. The receiving and decoding apparatus 56 may be arranged in any well known manner in accordance with the type of code that is to be transmitted and, may contain various units arranged in the proper way to form a digital pneumatic computer. The digital pneumatic computer used herein has a response time to the short bursts of pulses comparable to electronic or electrical components. This pneumatic digital computing apparatus which senses these sharp pulse bursts may be of the type described in the article entitled "Pneumatic Digital Computers," as published in the periodical "Electromechanical Design" for the month of June, 1961, beginning on page 36, or of the type disclosed in the advertisement by Moore Products Co. on page 15 of the May, 1961 issue of "Control Engineering," which also respond to short bursts of pressure. With respect to the type illustrated on page 15 of the May 1961 issue of Electronics, and with reference to FIG. 4, the sharp bursts of air are sensed at orifice 59 of pulse counter P. The air from section 18A of the pipe 18 is applied to one of the conduits A or B because of the characteristics of the counter P. Each burst of air into the orifice 59 shifts the air from the conduit A to conduit B and vice versa for supplying pressure alternately to opposite sides of a conventional pressure responsive switch PN. The operation of the switch PN in response to each burst of air shifts its contact C to its opposite position. The contact C provides the function of a so-called line relay to operate a conventional time mode receiving apparatus of the type generally described in the U.S. Patent No. 2,399,734. The code receiving apparatus selectively energizes one of the relays CS–1 through CS–5 respectively in accordance with the code received. Each of the relays CS–1 through CS–4 operates by an obvious circuit a respective one of the associated solenoid valves SV–1 through SV–4. Both these systems are effectively unresponsive to the changes in brake pipe pressure as they occur during a brake application or recharging.

Thus, in so-called pneumatic digital computers of this type, a source of operating air is selectively directed in accordance with the code, which is comprised of a series of short bursts of high pressure air. The operating air for the computer 56 in accordance with this embodiment of the invention is supplied from the air brake reservoir 22 through pipe 24 and a pipe 58. In accordance with the code received by the apparatus 56, one of the solenoid valves SV–1 through SV–4 is energized which permits air pressure of a predetermined amount to be introduced from the pipe 58 selectively into a respective one of the pipes 60, 62, 64 or 66. For example, if the button A is operated, the valve 45 is operated so that sharp bursts of air occur in a particular time sequence to cause the pressure switch PN to operate the code receiving apparatus so that relay CS–1 operates the magnet valve SV–1 to close off the outlet to atmosphere and open the pipe 58 thereby causing air under pressure to be introduced into the pipe 60. If the button B is operated air under pressure is introduced into pipe 62, and if the button C or D is operated air is introduced into the pipe 64 and 66 respectively. In response to the operation of the "off" button a code is sent which energizes the relay CS–5, to open the stick circuit of any energized relay CS–1 through CS–4 as is obvious from FIG. 4, thereby deenergizing its associated solenoid valve SV and removes air pressure from those pipes 60, 62, 64 and 66 which previously contained air. Also, if the button A is operated to cause the apparatus to energize valve SV–1 thereby effecting a slight degree of braking, and the button B is subsequently operated, the operation of the button B energizes the relay CS–2 which deenergizes the relay CS–1 by opening its obvious stick circuit. The valve SV–1 is thus deenergized and closes off the inlet 58 and opens the vent to atmosphere to remove air pressure from the pipe line 60.

The pipes 60, 62, 64 and 66 are connected in a well known manner to conventional apparatus that is comprised of a plurality pressure operated reducing valves that are adapted to be selectively operated in accordance with the pressure in these pipes. The apparatus 68 may be comprised of a bank of well known pressure reducing valves that are operated by pressure being applied thereto. Each of these valves is operable to conduct air under pressure from the reservoir 22 to the pipe 36 in varying amounts in accordance with the characteristics of the valve being operated. For example, with reference to FIG. 5, when the pipe 60 is filled with air of a predetermined pressure the reducing valve connected thereto permits reduced pressure say, for example, ten pounds, to be admitted from pipe 24 into the chamber 34 through the pipe 36. Similarly, the reducing valves connected to the other pipes 62, 64, and 66 are operated to permit correspondingly greater pressures to be introduced into the chamber 34 of the brake cylinder 30. The pipe 36 is connected at its one end 65 to the conventional exhaust port of the conventional brake control valve 20. When the pressure control valves in the apparatus or manifold 68 are closed or inactive, the chamber 34 is vented in a conventional manner to atmosphere through the pipe 28, the control valve 20, the pipe 36, valve 69 (FIG. 5) of the pressure control valve apparatus 68, and exhaust pipe 70. The valve 69 is a conventional pressure operated valve which normally permits air to exhaust from pipe 36 to pipe 70, but when operated from pressure in one of pipes 79, 80, 81, or 82, which connects to a manifold 83, closes off communication between pipe 36 and exhaust pipe 70. Each pipe 79, 80, 81, and 82 is connected to a respective one of the pipes 60, 62, 64, and 66, that in turn is connected to its associated pressure reducing valve, 84, 85, 86 and 87. Thus, when pressure is introduced into any one of the pipes 60, 62, 64, or 66, to open its respective valve, the exhaust pipe 70 closes. The apparatus or manifold 68 may take various well known forms. For example, as shown in FIG. 5, it may include the plurality of pressure reduction valves, 84, 85, 86, and 87 each of which is biased to a normally closed position, but respectively opened by pressure received over its respective control pipe 60, 62, 64, or 66, to permit air from pipe 24 to be introduced at a predetermined different reduced pressure into the pipe 36.

Referring to FIG. 3, a graph is illustrated to represent a series of sharp bursts referred to as 72. These sharp individual bursts referred to at 74 may occur at time spaced intervals in accordance with the desired code transmitted. The decoding apparatus detects these pulses 74 as being short pulses followed by a space or long pulses followed by a space as represented by line 76 of FIG. 3 with the pulses being referred to at 78. It is contemplated, that a short series of pulses according to a code is sufficient to operate the brakes of the train and to continue to apply them until the "off" button is operated and a releasing series of pulses transmitted and received. However, as an alternative it should be understood that in accordance with the requirements of practice, a code of a certain characteristic may be continually transmitted to maintain the brakes applied during the continuance thereof, with the brakes being released upon the cessation of the code. It is also contemplated that the control buttons A, B, C, D and "off" are of the type that remain in their last operated position so that the operator can determine what degree of braking is being effected. Although a time space code is shown for purposes of illustration any other type of code may be used, such as a counting code, for example.

The system according to the present invention may be operated at any time that the manual brake lever 32 is in its "running" position. As previously mentioned, with the braking system in this condition, the chamber 34 of the brake cylinder 30 is being exhausted to atmosphere through the conventional brake control valve 20, pipe 36, the pressure control valves 68, and the exhaust pipe 70. Also, with the lever 32 in "running" position the pressure in the brake pipe 10 and its branch line 16 and 18 are at a predetermined amount to maintain the brakes normally released as controlled by the pressure in the brake pipe 10.

Assuming that a medium degree of braking is desired, the operator depresses the button C, for example, which causes a distinct code of sharp bursts of high pressure air to be introduced into the brake pipe 10 by way of the opening 44 of the nozzle 42 which is received and decoded by the apparatus 56 to introduce air under pressure into the pipe 64. This closes off the exhaust port 70 and admits air under pressure from the reservoir 22 through pipe 24, the control valve manifold 68, the brake control valve 20, and the pipe 28 to the chamber 34 for operating piston 80 in a right-hand direction as viewed in the drawings to apply the brake shoes of each car in accordance with the pressure in the chamber 34. At this time, the feed valve air from the control apparatus 15, keeping pipe 10 charged will replenish the discharged air from the reservoir 22 by way of pipe 16, brake control valve 20, the pipe 26, and the pipe 24. If the operator desires to release the brakes momentarily he merely depresses the "off" button which causes the valve connected to the pipe 64 to be returned to its inactive position for exhausting the chamber 34 through the port 70. The operator may again decide to apply the brakes to a different or the same degree of braking by operating another button such as A, for example, to introduce air of a lesser pressure into the chamber 34.

If, any part of the auxiliary system according to the present invention should fail, or should be rendered inoperative, the operator may move the lever 32 to the "service" braking position or "emergency" position which reduces the pressure in the brake pipe 10 in a conventional manner as previously described to close off the exhaust port of the brake control valve 20, and permit the brakes to be applied by the introduction of air from the air brake reservoir 22 through the pipes 24 and 26 connected to the control valve 20. Thus, the conventional system takes precedence over the operation of the auxiliary control system whenever it is desired and the operation of the auxiliary system does not in any way interfere with the conventional application of the brakes. Also, in the event that any portion of the apparatus incorporated in the brake control system should lack or otherwise lose air, the system is so constituted that such an occurrence is still detected by the conventional braking system of the train to apply the brakes on a fail-safe principle.

Thus, it is apparent that we have provided an improved braking system which applies the brakes of all cars of a train immediately upon operation thereof to any desired degree of braking, which practically eliminates any "slack action" when braking the train. Also, that the system herein may be operated to fully apply and partially release the brakes in succession, as desired, to effect any degree of braking; and further that the system does not interfere with the operation of the conventional braking systems.

Although one specific embodiment of a system according to the present invention is illustrated, it is understood that various additions and modifications may be made without departing from the spirit or scope of the invention, as defined in the following claims.

What we claim is:

1. A system for operating the brakes of a train of railroad cars comprising a pressure reservoir on each car for supplying air under pressure to its respective brake cylinder, a brake pipe extending the length of the train and having branch lines operatively connected to each of the pressure reservoirs, means for supplying air under pressure to each of said reservoirs through said brake pipe to charge said brake pipe and reservoirs with gas of a predetermined pressure, valve means communicating with the interior of said brake pipe effective when operated to introduce gas into said brake pipe at a pressure in excess of said predetermined pressure, means effective to operate said valve means repeatedly to introduce a series of blasts of said gas into said brake pipe, receiving means on each car operatively connected to said brake pipe and said reservoir effective upon sensing said series of blasts to cause air from said reservoir to be supplied to said brake cylinder for operating the brakes of the train.

2. A system according to claim 1 wherein said valve means includes a nozzle having a discharge opening of substantially smaller diameter than the interior diameter of said brake pipe for introducing said series of blasts into said brake pipe.

3. A system according to claim 1 wherein said valve operating means includes coding means effective to repeatedly operate said valve means in accordance with a distinct code.

4. A system according to claim 3 wherein said receiving means includes decoding means distinctively operated in accordance with a series of short blasts corresponding to a distinct code, and pressure valve means distinctively operated in accordance with the distinct operation of said receiving means to control the amount of pressure introduced into said brake cylinder for controlling the degree of braking.

5. A system according to claim 4 wherein said decoding means is a digital computer responsive to a distinct series of blasts.

6. A system according to claim 5 wherein said digital computer is effective to supply gas under pressure selectively to operate said pressure valve means in a distinctive manner.

7. A system according to claim 6 wherein said pressure valve means is effective to vent said brake cylinder to atmosphere when no series of blasts are detected by said receiving means.

8. A braking system for railway trains, comprising a reservoir on each car for transferring air under pressure therefrom into its brake cylinder for applying the brakes, a brake line commonly connecting each of said reservoirs through which said reservoirs are charged with air, valve means on each car effective when operated to cause its reservoir to transfer air under pressure into the brake cylinder, and pulse producing means effective to transmit short blasts of air under pressure through said brake pipe to operate each said valve means simultaneously with the charging of each reservoir.

9. In a brake control system for railway trains having a plurality of cars wherein each car is provided with a reservoir containing air under pressure and a brake cylinder assembly operable to receive air under pressure for operating the brakes of the car and a control valve normally shutting off the air in said reservoir and having an exhausting means to exhaust said brake cylinder to atmospheric pressure, said control valve being effective when operated to admit air under pressure to said brake cylinder assembly, a brake pipe extending the length of the train that is normally charged with air under pressure of a predetermined amount and having a conduit connected operatively to each brake control valve so that a detected decrease in pressure in said brake pipe is effective to operate said control valves, and means on the locomotive effective to control the pressure in said brake pipe, the combination of a pressure valve means on each car having an output conduit communicating with each brake cylinder and an input conduit connected to the outlet of said reservoir, said pressure valve when operated being effective to admit air under pressure from said reservoir to said brake cylinder to apply the brakes, pulse producing means on the locomotive effective to introduce into said brake pipe short blasts of air at pressure in excess of the pressure in said brake pipe, and decoding means operatively connected to said pressure valve effective to operate said pressure valve upon detecting said short blasts of air in said brake pipe.

10. A system according to claim 9 wherein said pressure valve means is effective to be distinctively operated to select the amount of air under pressure to be introduced to said brake cylinder in accordance with a distinctive operation of said decoding means.

11. In a system according to claim 9 wherein said pressure valve means is selectively operated in accordance with and governed by air under pressure from said decoding means, and said decoding means is connected to said reservoir operatively so that the air under pressure in said reservoir supplies the air conducted from said decoding means.

12. In a system according to claim 9 wherein said brake cylinder is exhausted normally through said brake control valve and said pressure valve, said pressure valve when being operated shuts off said exhaust while introducing air under pressure through said brake control valve to said brake cylinder.

13. A system according to claim 9 wherein said pulse producing means on the locomotive is effective to introduce a series of said short blasts successively, and said decoding means is effective to permit air under pressure to be admitted to said brake cylinder while detecting said blasts only.

14. A system according to claim 9 wherein said reservoir may be recharged with air when said pressure valve means is being operated to admit air under pressure to said brake cylinder.

15. A system according to claim 9 wherein said pulse producing means includes a nozzle of substantially smaller diameter than said brake pipe positioned in said brake pipe and in communication with the air under pressure therein.

16. A system for controlling the brake of a railway train wherein each car has a brake cylinder for mechanically applying the brakes of a train when air under pressure is introduced therein, a reservoir for supplying air under pressure in each car, a brake pipe commonly connected to all of said reservoirs for recharging said reservoir to a predetermined pressure, a pressure valve means on each car connected to its respective reservoir effective when operated to introduce air under pressure into its respective brake cylinder, pulse producing means on the locomotive connected to said brake pipe effective to introduce sharp blasts of air in said brake pipe, and decoding means operatively connected to said pressure valve means effective to be operated upon detecting said short blasts of air in said brake pipe.

17. In a system according to claim 16 wherein the pressure introduced into each brake cylinder is selectively controlled by said pressure valve means to provide selective degrees of braking, and said decoding means is effective to control said pressure valve means in accordance with the coded blasts of air detected in said brake line.

No references cited.